United States Patent [19]
Reddy

[11] Patent Number: 6,060,107
[45] Date of Patent: *May 9, 2000

[54] REDUCED FAT MULTIPURPOSE SPREAD

[75] Inventor: Podutoori Ravinder Reddy, Columbia, Md.

[73] Assignee: Lipton, Division of Conopco, Inc., Englewood, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/002,125

[22] Filed: Dec. 31, 1997

[51] Int. Cl.$^7$ ...................................... A23D 7/015
[52] U.S. Cl. ........................... 426/603; 426/601; 426/602
[58] Field of Search .................................. 426/603, 602, 426/601, 573

[56] References Cited

U.S. PATENT DOCUMENTS

| | | | |
|---|---|---|---|
| 4,103,037 | 7/1978 | Bodor | 426/575 |
| 4,280,011 | 7/1981 | De Simone | 426/536 |
| 4,308,294 | 12/1981 | Rispoli | 426/603 |
| 4,865,867 | 9/1989 | Platt | 426/604 |
| 4,917,915 | 4/1990 | Cain | 426/603 |
| 4,990,355 | 2/1991 | Gupta | 426/604 |
| 5,079,023 | 1/1992 | De Simone | 426/536 |
| 5,151,290 | 9/1992 | Norton | 426/603 |
| 5,169,668 | 12/1992 | Milo | 426/602 |
| 5,194,285 | 3/1993 | Norton | 426/603 |
| 5,346,716 | 9/1994 | Bakal | 426/604 |
| 5,387,426 | 2/1995 | Harris | 426/604 |
| 5,464,645 | 11/1995 | Wesdorp | 426/604 |
| 5,472,729 | 12/1995 | Larsson | 426/804 |
| 5,523,111 | 6/1996 | Nickel | 426/661 |
| 5,554,407 | 9/1996 | Bodor | 426/603 |

*Primary Examiner*—Carolyn Paden
*Attorney, Agent, or Firm*—Gerard J. McGowan, Jr.

[57] ABSTRACT

A multi functional edible spread is disclosed as having both a fat and aqueous phase. The spread contains 65 wt % or less triglyceride fat and 0.5 wt % to 12 wt % emulsifiers. At least a portion of the emulsifiers are incorporated into the aqueous phase and are complexed in a starch based clathrate to diminish the taste and flavor problems associated with emulsifiers.

17 Claims, 2 Drawing Sheets

REDUCED FAT MULTIPURPOSE SPREAD

BACKGROUND OF THE INVENTION

The present invention relates to reduced fat edible spreads suitable for use both as table spreads and frying and cooking spreads including baking, and particularly to spreads having a reduced fat content.

Edible spreads such as margarine are often used for shallow frying purposes. Margarine, like butter, contains around 80% fat and 20% of a water phase. In recent years, efforts to decrease the fat intake in the diet have led to the increased use of reduced fat spreads comprising around 60% fat and 40% aqueous phase. This doubling, or in some cases, further, increase in water content leads to "spattering" and other problems when such spreads are used for shallow frying.

Another problem with the use of low fat spreads in cooking applications concerns the need for relatively high levels of emulsifiers in cooking spreads. This is particularly true for baking applications.

Nickel et al., U.S. Pat. No. 5,523,111 discloses clathrate inclusion complexes, such as for reducing the amount of fat and/or oil necessary for specific food products. The complexes may be used for the delivery of specific molecules such as fats, oils and related molecules.

U.S. Pat. No. 4,979,554 (Larsson et al.) describes a low fat spread having an emulsion such that the final product can be pasteurized. Storage stability of the product is obtained by combining starch with a small amount of an emulsifier which is capable of preventing gel formation by forming a starch/emulsifier complex, U.S. Pat. No. 5,472,729 (Larsson) discloses a method for producing a low fat spread whereby starches selected are acid hydrolyzed, and if necessary further stabilized from gelling by further reactions of starch with reagents capable of adding functional groups to the starch molecule. The stabilization imparted by these functional groups makes it possible to obtain such stabilization that the starch does not gel after solubilization. Thus the need for the use of emulsifiers as described in U.S. Pat. No. 4,978,554 is strongly reduced. Starches described in U.S. Pat. No. 5,472,729 are said to exhibit a heavy viscosity peak upon gelatinization after which the solution becomes thinner. Upon cooling, the starch in the solution does not gel and, in fact, the viscosity remains at a low level.

SUMMARY OF THE INVENTION

The present invention is directed to certain multifunctional reduced fat spreads, i.e., spreads which are capable of serving both as table spreads and frying or cooking, e.g., baking, spreads. In accordance with the invention, a spread, preferably a fat continuous plasticized spread, is prepared having 60% or less triglyceride and other fat, especially 40% or less fat. The spread includes emulsifiers at levels which are elevated relative to the normally acceptable levels for good taste or flavors in table spreads. The emulsifiers are complexed with clathrate inclusion complexes, especially clathrate inclusion complexes based on starch.

The presence of elevated levels of emulsifiers relative to table spreads in accordance with the invention is important to impart desirable functionality for cooking spreads. Yet, the negative taste and flavor attributes associated with higher levels of emulsifiers in table spreads can be expected to be minimized by providing the emulsifier in the clathrate inclusion complex. Any clathrate inclusion complex which can be expected to minimize or eliminate the negative attributes associated with higher emulsifier levels and table spreads can be used, such as those of Nickel et al., U.S. Pat. No. 5,523,111.

In addition to permitting the spreads to be used in cooking applications, wherein higher levels of emulsifiers are often required, use of the clathrate complexes and the attendant high emulsifier levels can also be expected to minimize spattering.

In a particularly advantageous feature of the invention, the total amount of emulsifier in the spread is such that the spread would fail adequately to release salt in the mouth of the consumer after eating if at least part of the emulsifier were not complexed with the clathrate. Adequate release of salt is measured using the emulsion stability conductivity test described below.

In accordance with another particularly advantageous feature of the invention, at least a portion of the emulsifiers have a high HLB value (greater than 6), and at least a portion of the high HLB emulsifiers are complexed in a starch based clathrate, the total amount of emulsifiers in said spread being such that the emulsion would be disrupted by the high HLB emulsifiers if the emulsifiers were not complexed in the clathrate. The high HLB emulsifier tend to make the emulsion water continuous. Disruption of an emulsion can be readily detected by one of ordinary skill in the art using a microscope. The emulsion would barely be fat continuous. The lack of fat continuity can be easily verified by measuring the conductivity.

For a more complete understanding of the above and other features and advantages of the invention, reference should be made to the following detailed description of preferred embodiments.

DETAILED DESCRIPTION OF THE INVENTION

The present invention is an edible spread having a reduced fat content as compared with margarines, that is, spreads comprising 65 wt. % or less fat. It is expected that particularly useful spreads can be prepared with a fat content of 30–50 wt. %, preferably 35–45 wt. It is believed that compositions according to the present invention not only will have excellent taste and flavor when used as table spreads, but they will exhibit acceptable primary and secondary spattering behavior. Moreover, they include emulsifier levels necessary for certain cooking spreads applications.

Preferably the compositions of the invention are water-in-oil emulsions comprising salt, the emulsifiers, the starch or other clathrate-forming ingredient, and fat.

Typically the spread comprises from 0 to 60 wt. % of a fatty phase and from 40 to 100 wt. % of an aqueous phase. Some or all of the fatty ingredients, eg. Monoglyceride emulsifiers and triglyceride, will be present complexed with the clathrate, which is expected to be present in the aqueous phase. In addition, if desired some fatty materials, eg.

triglyceride fat, may be present outside the clathrate in the fatty phase. Such spreads can be used for shallow frying, baking and spreading purposes. They can be used either for cold or hot toppings (eg., for toast). Preferably the aqueous phase is dispersed within the fatty phase.

Taste and flavor problems associated with table spreads having elevated emulsifier content are diminished in the present invention by use of clathrate inclusion complexes ("Clathrates"). Preferably the clathrates are highly dispersed. Clathrates are formed by inclusion of guest molecules in cavities that exist in crystal lattices or are present in large molecules. The guest molecule and the inclusion molecule are not held together by primary valence forces but instead are held by the physical relationship of the molecules. Accordingly, the geometry of the molecules is very important.

The present invention uses channel complexes, or clathrates, to disperse the guest emulsifier in the spread. The starting material is mixed with water. This mixture is heated past the gelatinization temperature of the starch-based starting material. The resulting hydrocolloid is cooled to approximately the convolution temperature of the starch-based starting material. An emulsifier, optionally together with other lipids, is introduced to the mixture as the resulting hydrogel is cooled to below the convolution temperature of the starch-based starting material. The resulting hydrogel is cooled to below the melting point of the emulsifier, if it is solid at room temperature, and to 45° C. for a liquid emulsifier, and homogenized. Upon cooling, the product thus obtained may be packaged for subsequent use.

Use of these clathrates may also reduce the amount of fat an/or oil necessary for specific food products. The clathrates, in effect, provide a molecular encapsulation of the emulsifier and/or other guest molecule. The encapsulation is believed to allow for a much improved delivery of the emulsifiers over traditional methods using mechanical means. In particular, the use elevated amounts of emulsifier in table spreads has often led to a waxy mouthfeel and to impaired salt or flavor release.

Preferred clathrates are also hydrocolloids, thereby providing a very stable high order of dispersion.

Compounds which form a channel cavity around a guest molecule may be used. These include cyclodextrins, cellulose and starch. It is contemplated that both amylose and amylopectin are useful in the present invention. Compounds which form a cage around the guest molecule may also be used. Clathrates and methods of processing them are disclosed in Nickel et al., U.S. Pat. No. 5,523,111 the disclosure of which is incorporated by reference.

Amylose useful in the present invention may be obtained from numerous sources, including peas, corn (including high amylose corn containing 55–80% amylose), potatoes and beans. It is preferred that the starting material have an amylose content of at least 10% by weight. In addition, it is desirable that the starch be acetylated to a degree of substitution of acetyl groups of between 0.05 and 0.15 because a starch modified in this manner does not retrograde and is thus an excellent inclusion molecule. Starch that has been acetylated in this manner is available from Woodstone Foods Corporation of Winnnipeg Manitoba, Canada under the tradename STILLWATER™ powder.

A uniformly aceytylated starch molecule is preferred because it ties up preferential hydrogen bridge bonding sites on the starch thereby preventing starch retrogradation, agglomeration and decreasing the order of magnitude of the dispersion. Accordingly, a very stable dispersion may be formed.

The starch may be modified with any of a number of acyl groups for use in food products. Acyl groups include formyl, acetyl, propionyl and benzoyl groups. Acetyl modification is most preferred.

The spreads of the inventions include emulsifiers suitable for use in foods. It is contemplated that emulsifiers which are approved for food use in the future, as well as those presently employed, can be used. Emulsifiers complexed with the clathrates in accordance with the invention will generally be disposed in the aqueous phase of the spread. However, emulsifiers may also be present in the fat phase, particularly emulsifiers which are not complexed with the clathrate.

The composition of the fatty phase preferably comprises one or more vegetable oils, preferably sunflower oil, soybean oil, rapeseed oil, peanut/groundnut oil and the like, together with a suitable hard fat component as a hardstock. If desired, dairy and other animal fat may also be used. Dairy, other animal fat sources and miscellaneous fat sources include milk (milk fat), buttermilk, fish oil, lard and tallow. If desired, the fat may be hydrogenated, fractionated and/or interesterified.

Non-digestible fats may also be used as the fat source. Amon the non-digestible fats are included polyol polyesters of $C_8$ to $C_{22}$ fatty acids such as sucrose polyester, sucrose polyethers, silicone oils/siloxanes, polycarboxylic acid esters, branched chain fatty acid triglycerides, neopentyl alcohol esters, dicarboxylic acid esters, jojoba oil and triglycerol ethers. Non-digestible fats may be used as from 0 to 100% of the fat, especially from 10 to 90%, and most especially from 25 to 75%.

Non-lipid fat replacers may also be used, to provide body to the product. these include protein-based fat replacers such as those described in Singer et al., U.S. Pat. No. 4,961,9534 and cellulosic bulking agents such as microcrystalline cellulose and carboxymethyl cellulose.

Coloring agents in addition to beta carotene such as paprika, turmeric and annatto may be employed.

In addition to sodium chloride, flavor enhancers which may be employed include lactones, lipolyzed butter oils and starter distillates, diacetyl, 2-octanone, butyric acid, hexanoic acid, and other fatty acids, esters of butyric acid, delta-hydroxy acids and their glycerol esters and mixtures thereof.

Preservatives, such as benzoic acid, sorbic acid, phosphoric acid, lactic acid, acetic acid, hydrochloric acid and the soluble salts thereof may be used. Likewise, the fat-continuous emulsion may include antimicrobials such as potassium sorbate, sodium sorbate, potassium benzoate, sodium benzoate and phosphoric acid.

Antioxidants may include normal propyl gallate, the tocopherols, including Vitamin E, buylated hydroxyanisole (BHA), butylated hyudroxytoluene (BHT), nordihydroguaiaretic acid (NDGA), tertiary-butylhydroquinon (TBQH) and citric acid.

As indicated above, the fat phase may include emulsifiers, in addition to those complexed with the clathrate. The clathrate complexed emulsifiers will generally be found in the aqueous phase. Emulsifiers useful in the fat phase and suggested maximum usage levels are set forth below. These emulsifier levels are suggested maximums, and may vary depending on whether they are used in another emulsifier. Particularly preferred are the emulsifiers which are used in traditional spreads. Levels given are wt. % based on the total weight of the spread.

|  | Maximum Level | Preferred Level | Minimum Level |
| --- | --- | --- | --- |
| Monoglycerides | 6.0 | 4.0 | 0.05 |
| Diglycerides | 12.0 | 6.0 | 0.05 |
| Polyglycerol esters of fatty acids (HLB value below 6.0) | 6.0 | 3.0 | 0.05 |
| Phopholipids (including lecithin) | 6.0 | 3.0 | 0.05 |
| Sugar polyesters of fatty acids | 6.0 | 3.0 | 0.1 |
| Phospholipids (various types) | 6.0 | 3.0 | 0.1 |
| Polyglycerol esters of fatty acids (HLB value above 6.0) | 6.0 | 3.0 | 0.2 |
| Polyhydric alcohol mono and di esters of fatty acids | 6.0 | 3.0 | 0.2 |
| Acyl Lactylates e.g. SSL | 6.0 | 3.0 | 0.2 |
| Diacetyl Tartaric acid esters of mono and diglyceride (DATEM) | 4.0 | 2.0 | 0.2 |
| Ethoxylated mono and diglycerides | 4.0 | 2.0 | 0.2 |
| Polysorbate 60, Polyorbate 80 | 4.0 | 2.0 | 0.1 |

HLB = Hydrophilic-Lipophilic Balance

The fat phase will generally include a blend of hard stock and liquid oil. The hard stock may be a combination of hydrogenated, partially hydrogenated, interesterified, fractionated, and liquid oil, in particular non-tropical and tropical oils and animal fats. The fat blend is characterized by its solids at various temperatures referred as to N-Line or N-values. The N-value is measured using NMR and gives the solid fat content at certain temperature. Measurement of N-values is described in Fefte, Sefein, Anstrichmittel Vol. 80, pp. 180–186 (1978). The method way be modified during the stabilization of the material before measurement; in all cases the fat should be stabilized for 16 hours at 0° C. and one hour at the measuring temperature prior to measurement.

The trans fatty acid content of the blend may range from 0 to 40%. Preferably the N-Lines for the hardstock and the blend of oil and hardstock will be within the ranges given below:

N-line for Hardstock:

$N_{10}$=45–70

$N_{15}$=44–65

$N_{20}$=42–52

$N_{25}$=30–40

$N_{30}$=27–37

$N_{35}$=20–30

N-line for the blend:

$N_{10}$=8–45

$N_{20}$=4–30

$N_{30}$=1–15

$N_{35}$=0–5

N-line values ranging from those appropriate for very soft spreads to those needed for very hard spreads may be used. The spreads of the invention may, therefore, be for instance tub spreads, which are softer, or stick spreads, which are harder.

Additionally the fat phase preferably includes flavoring agents, and coloring agents, preferably including Beta-carotene. Also, other vitamins may be included.

The aqueous phase may include the following ingredients: dairy ingredients such as buttermilk, skim milk, milk, butter, yogurt, whey, caseinate, milk proteins, vegetable proteins, vitamins, salt for taste and as a preservative, gelling agents and thickening agents. Various sources for the gelling agents include plants, including marine plants, microorganisms, and animals. Gelling and thickening agents which may be used include but are not limited to gelatin, carrageenan, pectin, gellan gum, agar, guar, xanthan, locust bean gum, alginate, maltodextrin, native and modified starches, and pregelatinized starches. Appropriate aqueous and fat phase ingredients are found in Cain et al. U.S. Pat. No. 4,917,915 and Norton et al., U.S. Pat. Nos. 5,194,285 and 5,151,290, the disclosures of which patents are hereby incorporated by reference.

The aqueous phase may additionally contain preservatives such as potassium sorbate and sodium benzoate.

The clathrate complex utilized in the present compositions is generally incorporated into the aqueous phase. The clathrate complexes may be prepared as taught in Nickel et al., U.S. Pat. No. 5,523,111 incorporated by reference above.

Emulsifiers and the levels (wt. % based on the total spread) at which they can be incorporated into the Clathrate complex are as follows:

|  | Maximum level | Preferred Level |
| --- | --- | --- |
| Monoglycerides | 6.0% | 4.0 |
| Diglycerides | 12.0 | 6.0 |
| Polyglycerol esters of fatty acids (HLB value below 6.0) | 6.0 | 3.0 |
| Phospholipids (including lecithin) | 6.0 | 3.0 |
| Sugar polyesters of fatty acids | 6.0 | 3.0 |
| Phospholipids (various types) | 6.0 | 3.0 |
| Polyglycerol esters of fatty acids (HLB value above 6.0) | 6.0 | 3.0 |
| Polyhydric alcohol mono and di esters of fatty acids | 6.0 | 3.0 |
| Polyglycerol esters of fatty acids (HLB value above 6.0) | 6.0 | 3.0 |
| Acyl Lactylates e.g. SSL | 6.0 | 3.0 |
| Diacetyl Tartaric acid esters of mono and diglyceride (DATEM) | 4.0 | 2.0 |
| Ethoxylated mono and diglycerides | 4.0 | 2.0 |
| Polysorbate 60 | 4.0 | 2.0 |

HLB = Hydrophilic-Lipophilic Balance

Of course, various combination of the emulsifiers may be used, as well. HLB is a well know measure of the balance between the hydrophilicity and lipophilicity of an emulsifier. It is discussed on pages 170 and 171 of "Food Chemistry", 2nd edition, Revised and Expanded, 1985, edited by Owen R. Fennema, which is incorporated by reference herein.

Examples of Polyglycerol esters of fatty acid are, Santone 3-4-0, Santone 3-1SH, Santone 8-1-0, Santone 3-1S-XTR. (From Quest).

Elevated levels of emulsifier in conventional spreads prevents quick salt release, with a resulting adverse effect on flavor. In accordance with the invention, levels of emulsifier which are elevated with respect to normal levels in table spreads, are included. Complexing the emulsifier in the clathrate is designed to permit quick salt release despite elevated overall levels of emulsifier in the spread.

The ability of a spread to release salt is determined using the emulsion stability conductivity test.

EMULSION STABILITY CONDUCTIVITY TEST

The emulsion stability, determined by measuring the breakdown of the emulsion of margarines and spreads at increased temperature, is an important factor for the oral response. The method has a good correlation with panel taste assessments on oral response of refrigerated margarines and 40% fat spreads.

APPLICATION

The method is applicable to margarines and 40% fat spreads (40% fat). It is not applicable to tropical margarines.

PRINCIPLE

The change in conductivity of a fat spread in distilled water is measured during heating at a rate of 1° C. min, until the emulsion is totally broken down; even in unsalted margarines and halvarines.

EQUIPMENT

Figure 1A:
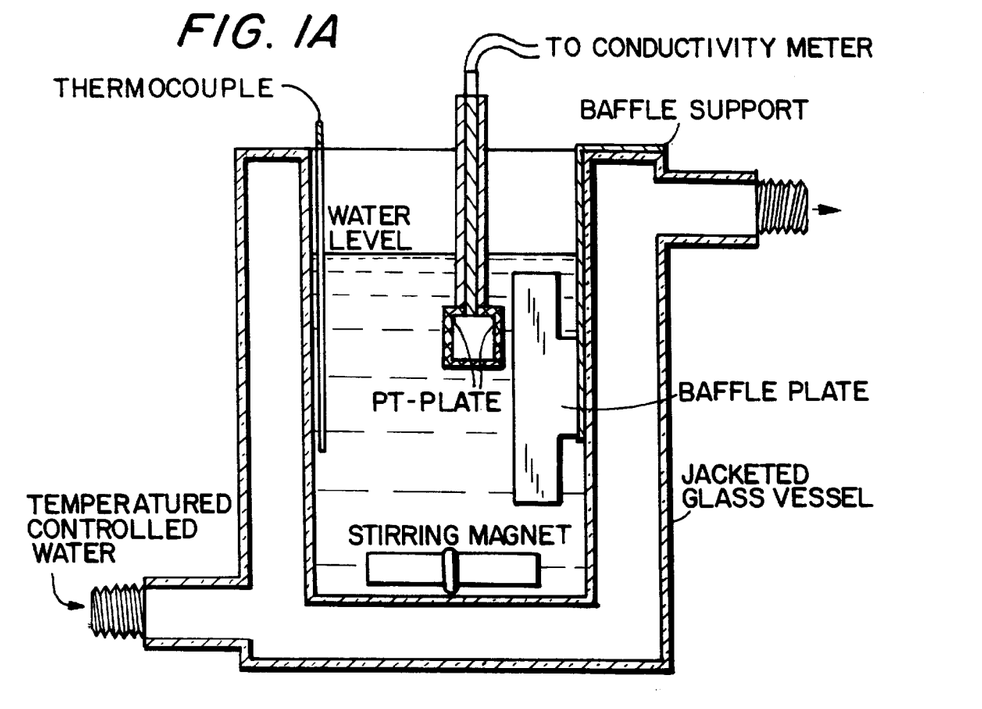
FIG. 1A is a vertical cross section through an apparatus used to measure emulsion stability.
Figure 1B:
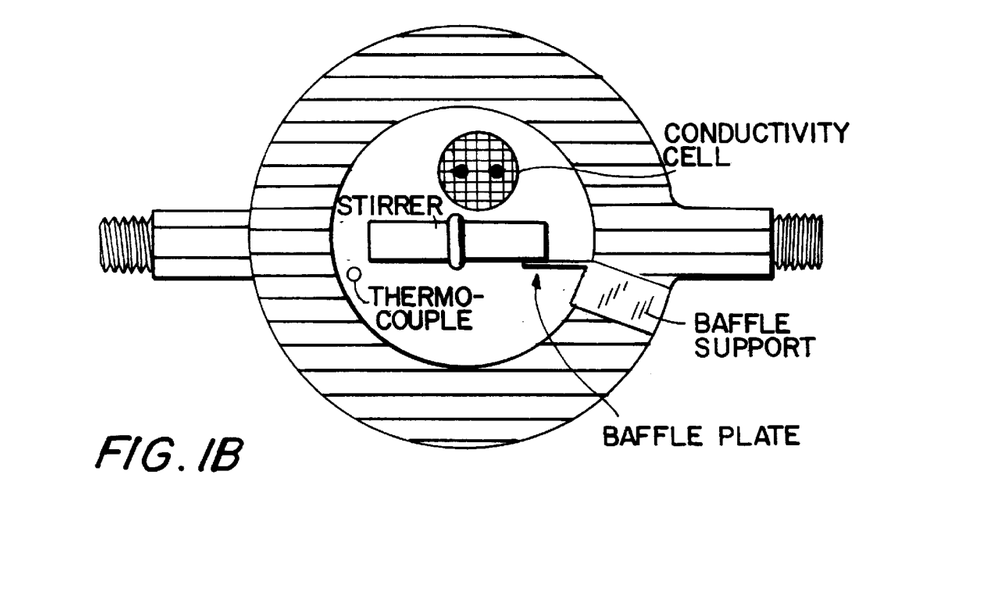
FIG. 1B is a top plan view of the apparatus of FIG. 1A.

| | |
|---|---|
| Vessel | Jacketed glass vessel 20, with an inner diameter of 5.9 cm and a minimum inner height of 9.5 cm (see FIG. 1) |
| Baffle Plate (16) | With a length of 5.0 cm and 1.0 in width which is fastened over a distance of 0.6 cm to a baffle support 14. |
| Stirring magnet 18 | With a diameter of 8.5 mm and a length of 38 mm. |
| Magnetic stirrer | Rotor speed has to be set at 1000 rev./min. |
| Conductivity meter | Philips, type 9501/01 or PW 9505 |
| Thermocouples | Two thermocouples, one for measuring the temperature in the vessel, one as cold junction. Type: Iron-constantan. Sensitivity: about 55.10–6 V/° C. |
| Temperature bath | Temperature range: 15–80° C. (with or without indirect cooling of the water bath). Accuracy ±0.1° C.; heating capacity 1000–1500 W; capacity of the pump ca. 10 1/min. |
| Temperature programming equipment | Lauda, P120/25, allowing a heating rate of 1° C. min. |
| Recorder | Two-channel recorder for writing the conductivity with measuring range 0–100 mV (dependent on the voltage of the recorder exit of the conductivity meter 12) and for writing the temperature with measuring range 0–5 mV (for iron-constantan thermocouple) |
| Glass syringe | Contents 2 ml, giving a string with a diameter of about 2 mm. |

PROCEDURE

PRE-TEMPERING

All samples should be kept in a constant-temperature cabinet for at least three days before measuring. The temperature can be 5, 10, 15, 20 or 25° C., 15° C. being most widely used.

1. MEASUREMENT 1.1 Place a thermocouple in the jacketed vessel and a thermocouple in the 0° C. bath which serves as a cold junction.

1.2 Check that the recorder is correctly zeroed.

1.3 Choose the correct cell constant range (0.3–1.0) and adjust the correct cell constant.

1.4 Switch "Temp. Comp." must be set at "20° C." and knob "Temp. Comp." at "0° C.".

1.5 Fill the jacketed vessel with exactly 200 ml of distilled water.

1.6 Switch on the magnetic stirrer at 1000 rev./min.

1.7 Set the temperature programming equipment at start position.
   starting temperature 23.5° C. (see note)
   temperature programming 1° C./min in off-position.

1.8 Choose the correct measuring range according to the following table:

| Expected salt/% | Measuring range on PW 9505 (s cm$^{-1}$) |
|---|---|
| 0.2 | 100μ |
| 0.2–1.0 | 300μ |
| >1.0 | 1 m |

1.9 Fill the glass syringe with ca. 2 g of the sample by pressing its wider opening into the sample and clean the outside properly.

1.10 Weigh the filled syringe.

1.11 Start temperature programming and recorder.

1.12 Inject the sample into the jacketed vessel when the water in the vessel has reached a temperature of 25° C.

1.13 Weigh the syringe and note the amount of sample that has been injected together with the sample code and the measuring range on the recorder paper.

1.14 The controlled increase of the temperature is continued until the emulsion has broken down completely; the conductivity will then increase according to the conductivity/temperature coefficient and the recorder will show a straight line.

1.15 Stop recorder and temperature programming.

1.16 Clean the jacketed vessel with acetone and distilled water by using a water jet air pump.

1.17 A next measurement can be carried out by starting at point 1.5.

NOTE

In order to know the temperature recording line as a function of temperature, calibration has to be made in the temperature range 25° C.–75° C.

2. CALCULATION (see FIG. 2).

Figure 2:
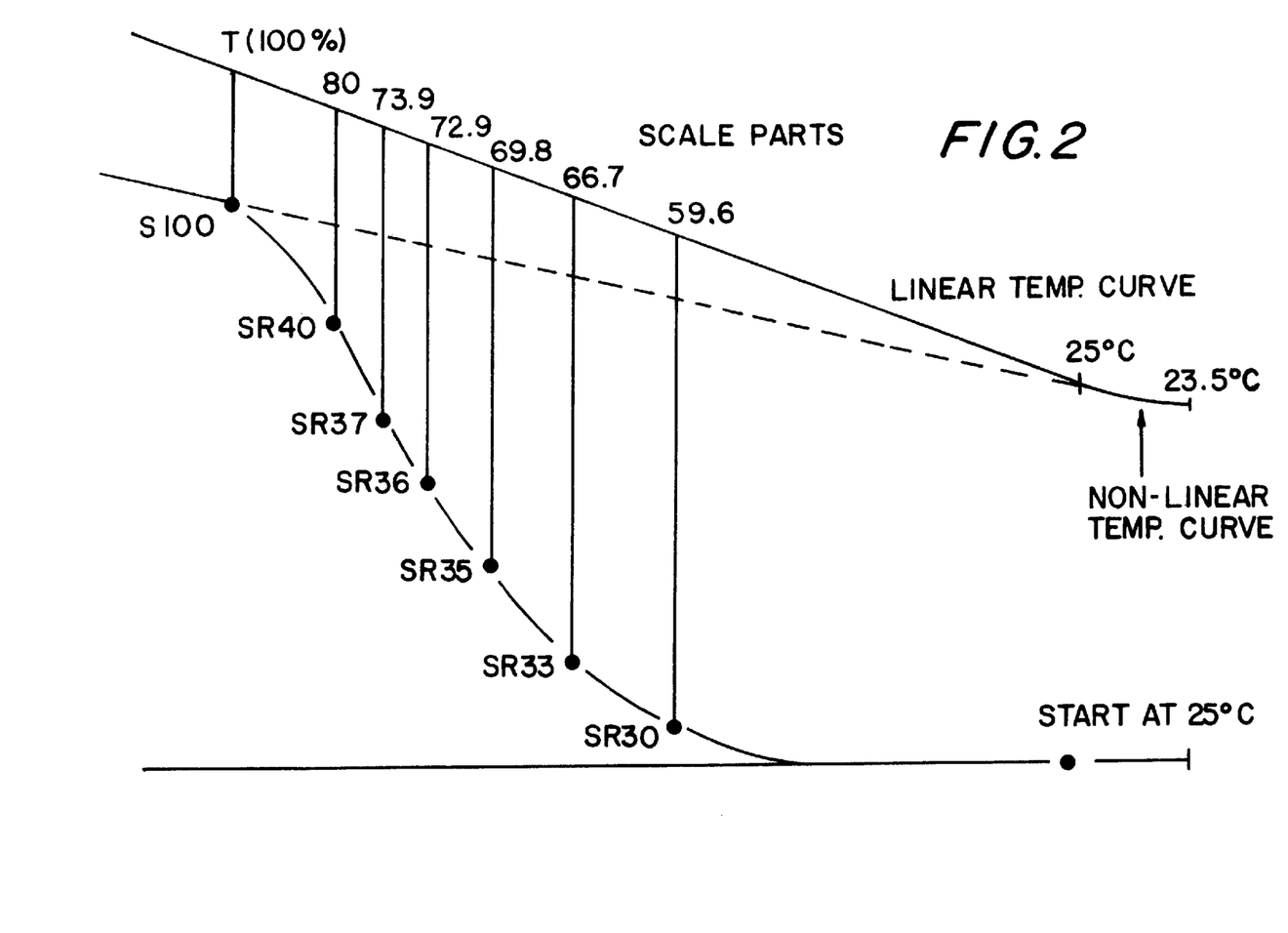
FIG. 2 is an example of a salt release curve wherein salt release, as measured by conductivity, is determined at varying temperatures.

2.1 Determination of temperature correction factor ($F_1$)
   With a standard NaCl-solution (1%) conductivity is measured at 37° C. where $F_1$-1.00.
   Then conductivity is measured in the temperature range 25–75° C.

$$F_1 = \frac{\text{conductivity at } 37° \text{ V}}{\text{conductivity at } t° \text{ C.}}$$

2.2 Determination of correction factor dependent on conductometer sensitivity range (F2).
   $F_2$ is measured with 3 standard NaCl solutions in the same range as salt concentrations of margarines, 0.2, 1.0 and 2.0%.
   Example: of a 0.23% NaCl-solution, 2 ml is injected in 200 ml distilled water in the jacketed glass vessel (FIG. 1). Recorder temperature line indicates 64 scale divisions at 36° C. ($F_1$-1.01). The measuring range of the conductometer is dependent on the salt concentration (see Table under 1.8).

conc. Salt (%)–number of scale divisions *$F_1$* $F_2$ weight of sample injected $$0.23 - \frac{64 * 1.01 * F_2}{2}$$

| conductometer range | F2 |
|---|---|
| 100 µS | 0.0072 |
| 1 mS | 0.073 |
| etc. | |

2.3 100% salt release

Determine the temperature at which 100% salt has been released -T 100%-, at the point -S100-, where the conductivity line is becoming linear (FIG. 2). Calculate T 100% with temperature correction factor (see FIG. 2).

2.4 Determine point SR 30, 33, 35, 36.5, 37 and 40° C. corresponding to temperatures t -30, 33, 35, 36.5, 37 and 40° C. Calculate emulsion breakdown as a percentage of the total measured salt concentration (S-100).

$$\text{Emulsion breakdown}(\%) - \frac{SR(t° C. \times F_1 \times 100\%)}{S100 \times F_1\prime}$$

Where
$F_1$—correction factor belonging to t° C.
$F_1'$—correction factor belong to T 100%
(correct for baseline deviations).

2.5 Calculation of the salt content as measured by way of conductivity (MSC, Measured Salt Content).

$$MSC - \frac{S100}{\text{weight of sample}} * F_1\prime * F_2$$

Products according to the invention have a T 100 of 45° C. and below, preferably 42° C. and below, especially 40° C. and beleow, most preferred 37° C. and below.

Optional anti-spattering agents effective against both primary and secondary spattering, comprise a mixture of an oxidized vegetable oil preferably "blown bean oil" and a source of phosphatides, in particular phosthatidyl choline, preferably "Cetinol"(®). Other optional anti-spattering agents include, nitrogen, salt, calcium chloride or phosphates, and emulsifiers such as egg yolk and lecithin. A preferred anti-splattering ingredient-containing composition for a spread according to the present invention is:

a) 0.05–2.00 wt. % thermally oxidized vegetable oil,
b) 0.1–1.00 wt. % phosphatide-containing, alcohol-extracted fraction of lecithin, wherein the phosphatides of the alcohol-extracted fraction have a phosphatidyl choline:ethanolamine ratio >2,
c) 0.25–3.00 wt. % salt, the overall spread including:
d) 30–50 wt. % fat phase, and,
e) 50–70 wt. % aqueous phase.

"Blown bean oil" is soya bean oil which has been subjected to at least partial oxidation and "Cetinol"(®) comprises a mixture of phosphatidyl choline (PC) and phosphatidyl ethanolamine (PE) with a PC/PE usually greater than 2 and preferably greater than 3.

Blown bean oils not in itself effective as a anti-spattering agent as regards secondary spattering, but is known as an emulsifier in spread manufacture and known to have some affect on primary spattering. Blown bean oil can be prepared by blowing air through heated soybean oil. Cetinol is known and used as an anti-spattering agent.

Accordingly, the compositions of the invention may include at least 0.05 wt. % and preferably at least 0.09 wt. % thermally oxidized vegetable oil, at least 0.25% preferably at least 0.5 and in particular at least 0.7% salt and at least 0.06 wt, % phosphatides, wherein the phosphatidyl choline:ethanolamine ratio is >2.

Preferably the anti-spattering agent for edible emulsion spreads comprises thermally oxidized vegetable oil and a phosphatide-containing, alcohol-extracted fraction of lecithin in a ratio of 1:10–10:1, wherein the phosphatides of the alcohol-extracted fraction have a phosphatidly choline:ethanolamine ratio >2.

The spreads of the invention may be made using known spread making techniques. In general, where the spread is to be fat continuous and to contain 40 wt. % or more of fat, the spread making process will involve initially preparing a fat continuous emulsion. Where less than 40 wt. % fat is to be included in the spread, typically a water continuous emulsion will first be prepared and the water continuous emulsion will later be inverted to a fat continuous emulsion.

EXAMPLE 1

Prophetic

Process pregelation technique disclosed in Cain et al., U.S. Pat. No. 4,917,915

A spread according to the invention is prepared as follows:

| Ingredients | % Wt. In Product |
|---|---|
| OIL PHASE | 24 |
| Lecithin | 0.2 |
| saturated distilled monoglycerides iodine value = <5 | 0.25 |
| unsaturated distilled monoglycerides (iodine value = 105) | 0.25 |
| flavor (artificial butter) | trace |
| beta carotene and vitamin A | trace |
| fat blend-partially hydrogenated bean oil and liquid oil | 23.3 |
| AQUEOUS PHASE | 74 |
| Clathrate with 3% monoglyceride (wt. in full spread) | 7.5 |
| gelatin pork-250 bloom | 3.0 |
| spray dried butter milk | 0.250 |
| EDTA, calcium sodium | 0.006 |
| lactic acid (88%) | 0.060 |
| K sorbate | 0.100 |
| Salt | 1.500 |
| Water | to 100 | a) The fat and aqueous phases are mixed together at approximately 55/C in a heated tank in a ratio of approximately 25 parts fat phase to 75 parts aqueous phase. This emulsion is water-continuous.

b) The emulsion is then passed through a cooled, scraped-surface heat exchanger (A-unit) where the emulsion is cooled to a temperature where the fat will begin to crystallize 5–10/C).

c) The and the aqueous phase will begin to gel (3–15/C, preferably cooled emulsion is then passed into a slowly agitated, low shear crystallizer (C-unit) where the aqueous phase gels or builds up viscosity. The amount of residence time varies depending on the emulsion formulation and temperature but normally ranges from 0.5 to 10 minutes. The shaft speed in the pre-gelation unit depends largely on its dimensions but normally varies from 10–300 RPM.

d) Once the desired viscosity of the product is obtained, the pre-gelled emulsion is passed into a high speed, high shear crystallizer (C*-unit) or invertor where the product is inverted from a water-continuous emulsion to a fat-continuous emulsion. The residence time in the invertor can vary from 0.25 to 6 minutes. The shaft speed of the invertor normally varies from 400–2000 RPM depending on the dimensions of the invertor.

If so desired, additional A-units or additional C-units can be added. The spread is compared to commercially available 40% table spreads and found to have a comparable taste. The spread is used to bake cookies without addition of further emulsifiers and the results are good.

EXAMPLE 2

Prophetic

| Ingredients | % Wt. In Product |
| --- | --- |
| OIL PHASE | 40 |
| Lecithin | 0.2 |
| saturated distilled monoglycerides iodine value = <5 | 0.25 |
| flavor (artificial butter) | trace |
| beta carotene and vitamin A | trace |
| fat blend-partially hydrogenated bean oil and liquid oil | 39.5 |
| AQUEOUS PHASE | 60 |
| Clathrate with monoglyceride (3% in wt. full spread) | 15.0 |
| gelatin pork-250 bloom | 2.500 |
| spray dried butter milk | 0.250 |
| EDTA, calcium sodium | 0.006 |
| lactic acid (88%) | 0.060 |
| K sorbate | 0.100 |
| Salt | 1.500 |
| Water | to 100 |

Inversion by fat injection technique described in Bodor et al. U.S. Pat. No. 4,103,037 which is hereby incorporated by reference herein.

The spread according to the invention is prepared as follows:

a) The fat and aqueous phases are mixed together at approximately 55° C. in a heated tank in a ratio of approximately 40 parts fat phase to 60 parts aqueous phase. This emulsion is water-continuous.

b) The emulsion is then passed through a cooled, scraped-surface heat exchanger (A-unit) where the emulsion is cooled to a temperature where the fat will begin to crystallize (few degrees C below the alpha point (5–25° C., preferably 8–20° C.)) and the aqueous phase will begin to gel, if the aqueous phase has the gelling agents, and/or there is increase in viscosity if only thickening agents are present in the aqueous phase.

c) The cooled emulsion is then passed into a slowly agitated, variable speed crystallizer (C*-unit) where the product is inverted from a water-continuous emulsion to a fat-continuous emulsion by quickly increasing the shaft speed. The inversion may be aided by injecting 100% fat into the system. The C*-unit is referred to as the inverter unit. The shaft speed in the invertor unit depends on its dimensions but normally varies from 200–2000 RPM.

d) The fat continuous emulsion is passed into an additional cooling unit to reduce the temperature of the emulsion and since there is a temperature rise due to heat of crystallization in the invertor.

e) Depending on the final product, for tub product, the cooled emulsion is passed through the crystallizer (C-Unit) to provide additional residence time and adjust the consistency for packaging in tub. For a stick product, the cooled emulsion may be passed through a B-Unit for additional residence time and increase the packing hardness for the product to be packed in the stick form. A B-unit is a long tube, which may have sieves, to provide gentle mixing while the fat continues to crystallize from the alpha to beta prime form.

Extra cooling capacity can be added to the process by including additional A-units. Extra residence time can be added to the process by including additional C-units.

Instead of the Bodor et al. process, the process described in the more recent Milo U.S. Pat. No. 5,169,668 may be used.

EXAMPLE 3a

Prophetic

Process for cold mixing technique according to Bodor et al. U.S. Pat. No. 5,554,407, hereby incorporated by reference herein A very low fat spread containing 23% continuous fat phase and 77% dispersed aqueous phase is prepared:

An aqueous phase solution is prepared containing the following ingredients:

| | Wt. % |
| --- | --- |
| Water | 86.123 |
| Gelatin (250 Bloom) | 3.25 |
| Ultra-Tex 2 | 1.5 |
| Whey Powder | 0.5 |
| Clathrate A (similar to Clathrate E described below) | 10.00 |
| Salt | 1.0 |
| Potassium Sorbate | 1.0 |
| Lactic Acid | 0.115 |
| | 100 |

Aqueous phase pH 4.8

A fat continuous emulsion is prepared separately with the following composition:

| | |
| --- | --- |
| Lecithin | 0.22 |
| Distilled Sat. Monoglycerides (IV = 4) | 0.25 |
| Soybean Oil | 42.9 |
| Hydrogenated Soybean | 28.6 |
| Oil Phase (MP = 40.5° C.) | 72 |
| Water | 25.68 |
| Citric Acid | 0.02 |
| Potassium Sorbate | 0.05 |
| Whey Powder | 1.25 |
| Salt | 1.0 |
| | 28 |

Aqueous Phase pH: 5.0

This fat blend has the following N-values: $N10=28.9$, $N20=15.1$, $N30=3.8$.

The fat continuous phase is prepared by heating the oils up to approximately 65° C. and adding the lecithin and already melted, distilled, saturated monoglycerides under moderate agitation. The second, non-gelling aqueous phase is prepared in a separate vessel by heating the water to 85° C. (for pasteurization) and then adding the dry ingredients and stirring until dissolved. This aqueous phase is then added to the already prepared fat along with small amounts of color and flavor. The entire emulsion is then cooled to 55° C. and ready for use.

The aqueous phase and the fat continuous phase are then processed as follows:

The aqueous phase is pumped through an A-unit where it is rapidly chilled to 15° C., a temperature well below the critical gelling temperature of this solution. the aqueous phase is then passed through a C-unit rotating at approximately 100 rpm to prevent channeling where it is given residence time of about 3 minutes in which it becomes thick and partially gelled. From there it is diverted into a water tank until ready for use.

Simultaneously, the fat continuous phase is started by pumping the fat continuous emulsion through an A-unit where it is rapidly cooled to 14° C., (well below the alpha-point for this fat blend) and then it is passed through a C-unit rotating at 300 rpm. Here the fat temperature increases from 14° to 22° C. The fat contains approximately 12.8% solid fat at this point. The fat continuous phase is then diverted into a waste tank until ready for mixing.

The flow rates of the two streams are adjusted to give a product of the desired fat content (23%). In this case the ratio is 32% fat continuous stream/68% aqueous phase stream.

When all is ready, the fat continuous phase is fed into a highly back-mixed mixer such as the one described in Bodor et al., U.S. Pat. No. 5,554,407 hereby incorporated by reference herein.

Gentle mixing (about 300 rpm) is begun in the mixer. When the mixer is completely filled with fat continuous phase, the partially gelled aqueous phase is then also fed into the mixer. At this point the shear is rapidly increased (1400 rpm) so that the flat continuous emulsion is maintained and the gelled aqueous phase entering the mixer is rapidly dispersed into the fat continuous emulsion. The temperature in the mixer increases to 26° C. At this temperature, the fat present contains approximately 8.3% solid fat. From the mixer, the product passes into a C-unit where the texture is adjusted by gentle shear and then the product is packed in plastic tubs. Initially after start-up, the product is high in fat and is discarded, but once the process achieves steady-state, the product can be packed as desired.

The product has the following composition:

|  | Wt. % |
| --- | --- |
| Distilled Sat. Monoglycerides | 0.08 |
| Soybean Oil | 13.7 |
| Hydrogenated Soybean Oil (MP = 40.5° C.) | 9.15 |
|  | 23 |
| Water | 71.8 |
| Gelatin | 2.2 |
| Clathrate A | 2.2 |
| Ultra-Tex 2 | 1.0 |
| Whey Powder | 0.74 |
| Salt | 1.0 |
| Potassium Sorbate | 0.13 |
| Lactic Acid | 0.08 |
| Citric Acid | 0.006 |
|  | 77.0 |

Serum pH 4.87

Clathrate E Example 3B (Prophetic) is prepared by mixing 6.4 kilograms of acetylated starch, having the tradename STILL-WATER powder and having a degree of substitution of acetyl groups of approximately 0.10 with 63.6 liters of water in a scraped surface kettle. This mixture is slurried in the kettle and heated to 85° C. for one to two minutes. Thereafter the mixture is cooled to 65° C. and 30 kilograms of monoglyceride (Myverol 1804 ex. Quest) are blended into the gel while it is cooled to 35° C. The monoglyceride is homogenized below 35° C. in a shear homogenizer. The solution is prepared by heating the water up to 85° C. and then gradually adding the dry ingredients with good agitation. After mixing for approximately 5 minutes, the solution is cooled to 55° C. and the lactic acid is added to obtain a pH of approximately 4.7–4.8. The solution is now ready for use.

EXAMPLE 4

Prophetic

Process (covers the normal fat continuous process 30–60% fat)

The spread according to the invention is prepared as follows:

a) The fat and aqueous phases are mixed together at approximately 55/C in a heated tank in a ratio of approximately 30–60 parts fat phase to 40–70 parts aqueous phase. This emulsion is fat continuous. Aqueous phase is added to the fat phase to aid in obtaining a fat continuous emulsion in the tank.

b) The emulsion is then passed through a cooled, scraped-surface heat exchanger (A-unit) where the emulsion is cooled to a temperature where the fat will begin to crystallize (5–25/C, preferably 8–20/C)) and the aqueous phase will begin to gel, if the aqueous phase has the gelling agents, and/or there is increase in viscosity if only thickening agents are present in the aqueous phase.

c) The cooled emulsion may then be passed through the C-unit, crystallizer. The shaft speed may vary and depends on its dimensions and the residence time required to crystallize the fat in line but normally varies from 100–900 RPM.

d) The fat continuous emulsion is passed into an additional cooling unit to reduce the temperature of the emulsion since there is a temperature rise due to heat of crystallization in the crystallizer.

e) Depending on the final product, for tub product, the cooled emulsion is passed through the crystallizer (C-Unit) to provide additional residence time and adjust the consistency for packaging in tub. For the stick product, the cooled emulsion may be passed through a B-Unit for additional residence time and increase the packing hardness for the product to be packed in the stick form.

Extra cooling capacity can be added to the process by including additional A-units. Extra residence time can be added to the process by including additional C-units.

| Example 4a, 30% fat product | |
| --- | --- |
| Ingredients | Wt. % |
| Oil phase | |
| Oil blend (partially hydrogenated oil and liquid oil) | 29.25 |
| Myverol 1804 (Distilled monoglyceride IV = 4) | 0.05 |
| Domodan OK (Distilled monoglyceride IV = 60) | 0.10 |

Example 4a, 30% fat product

| Ingredients | Wt. % |
|---|---|
| Lecithin | 0.20 |
| SANTONE 3-4-0 (polyglycerol esters of monoglycerides) from Quest | 0.40 |
| SUBTOTAL | 30.00 |
| AQUEOUS PHASE | 70.0 |
| Clatherate with monoglyceride of 3% | 8.5 |
| Salt | 1.20 |
| Keltone HV (sodium alginate from Kelco) | 1.00 |
| Lactic | 0.08 |
| K-sorbate | 0.12 |
| EDTA | 0.0080 |
| Water | to make it to 100 |
| Beta Carotene (Color and Vitamin) | trace |
| Flavor | trace |
| TOTAL | 100 |

Example 4b, 50% fat product

| Ingredients | Wt. % |
|---|---|
| Oil phase | |
| Oil blend (partially hydrogenated oil and liquid oil) | 49.5 |
| Myverol 1804 (Distilled monoglyceride IV = 4) | 0.20 |
| Lecithin | 0.20 |
| SUBTOTAL | 30.00 |
| AQUEOUS PHASE | 50.0 |
| Clatherate with monoglyceride of 3% | 8.5 |
| Salt | 1.20 |
| Lactic | 0.087 |
| K-sorbate | 0.12 |
| EDTA | 0.0080 |
| Water | to make it to 100 |
| Beta Carotene (Color and Vitamin) | trace |
| Flavor | trace |
| TOTAL | 100 |

Unless context demands otherwise, all percentages are wt. % and have reference to total product. Unless context demands otherwise, references to "fat" herein include triglyceride fat and other ingredients present in the fat phase of the product including hydrophobic emulsifiers, fat-soluble vitamins, etc. Typically, triglyceride fat will constitute at least 90 wt. % of the fat phase.

It should be understood, of course, that specific forms of the invention herein illustrated and described are intended to be representative only as certain changes may be made therein without departing from the clear teachings of the disclosure. Accordingly reference should be made to the following appended claims in determining the full scope of the invention.

What is claimed is:

1. A multifunctional edible spread having a fatty phase and an aqueous phase, and comprising 65 wt. % or less triglyceride fat and 0.05 wt % to 12 wt % emulsifiers, at least a portion of said emulsifiers being incorporated into the aqueous phase and complexed in a starch based clathrate to diminish taste and flavor problems associated with emulsifiers.

2. The spread according to claim 1 which is fat continuous and plasticized.

3. The spread according to claim 1 wherein the fat phase constitutes from 30–50 wt. % of the spread.

4. The spread according to claim 1 wherein said clathrate is formed from an acetylated starch.

5. The spread according to claim 1 wherein said emulsifiers include 4 wt. % or greater monoglyceride.

6. The spread according to claim 1 wherein said emulsifiers include 6 wt. % to 12 wt % diglyceride.

7. The spread according to claim 1 wherein said emulsifiers are present at a level of from 0.1 wt % to 12 wt. %.

8. The spread according to claim 7 wherein said emulsifiers are present at a level of from 2 wt % to 12 wt. %.

9. The spread according to claim 8 wherein said emulsifiers are present at a level of from 3 wt % to 12 wt. %.

10. The spread according to claim 9 wherein said emulsifiers are present at a level of from 4 wt % to 12 wt. %.

11. The spread according to claim 10 wherein said emulsifiers are present at a level of from 6 wt % to 12 wt. %.

12. A multifunctional spread comprising a fatty phase and an aqueous phase and comprising 65 wt. % or less triglyceride fat and 0.05 wt % to 12 wt % emulsifiers, at least a portion of said emulsifiers being complexed in a starch based clathrate, emulsion stability conductivity (T100) of 45° C. or less.

13. The spread according to claim 12 wherein said fat phase constitutes from 30–50 wt. % of the spread.

14. The spread according to claim 12 wherein the clathrate is formed from an acetylated starch.

15. A multifunctional spread comprising a fatty phase and an aqueous phase and comprising 65 wt. % or less triglyceride fat and 0.05 wt % to 12 wt % emulsifiers, at least a portion of said emulsifier having a high HLB of greater than 6, at least a portion of said high HLB emulsifiers being incorporated into the aqueous phase and complexed in a starch based clathrate.

16. The spread according to claim 15 wherein said fat phase constitutes from 30- to 50 wt. % of the spread.

17. The spread according to claim 15 wherein the clathrate is formed form an acetylated starch.

* * * * *